Oct. 31, 1961     G. E. FREDERICK     3,006,579
STEERING DISENGAGING MECHANISM
Filed May 19, 1960     2 Sheets-Sheet 1
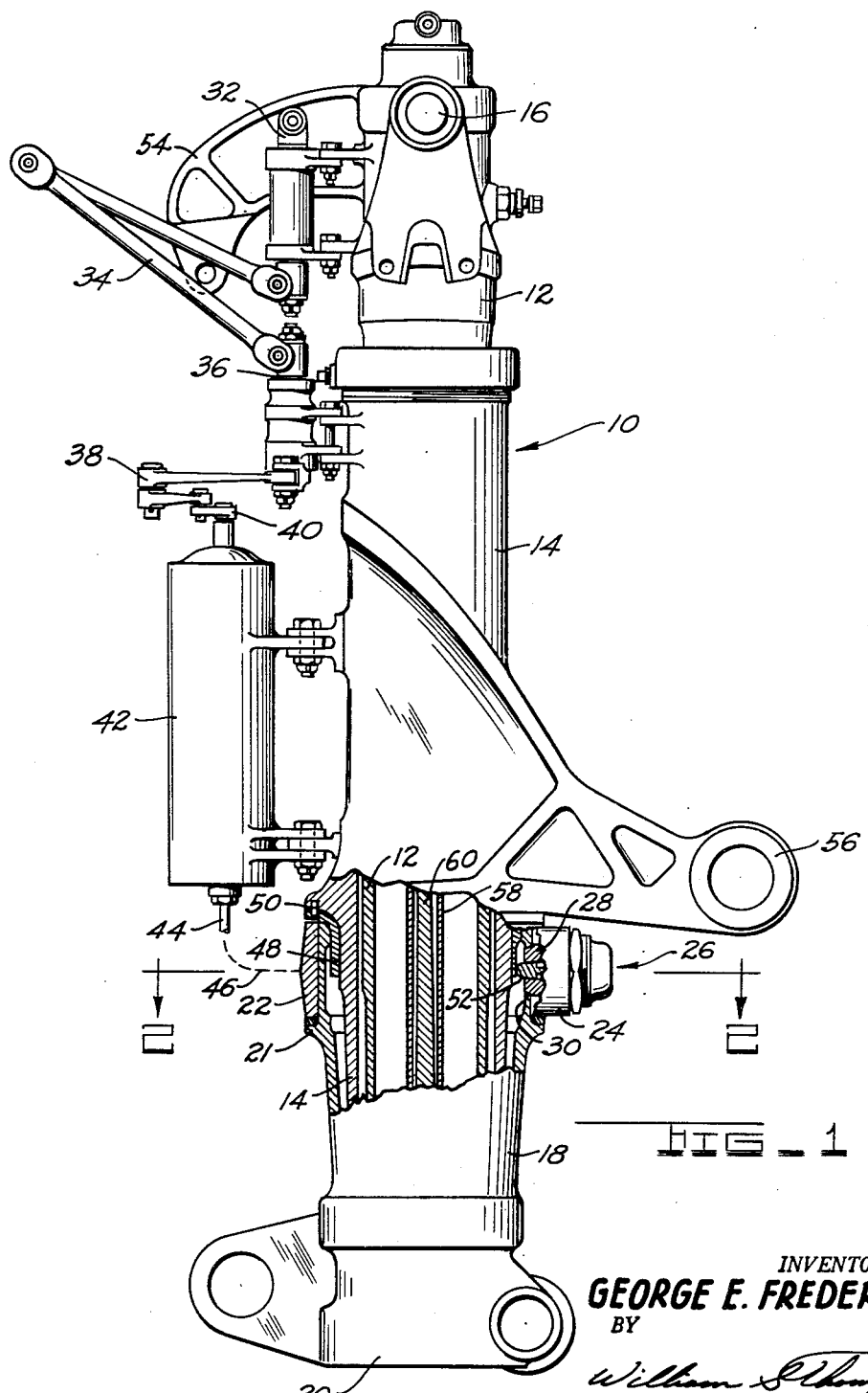
FIG_1
INVENTOR.
GEORGE E. FREDERICK.
BY
William S. Thompson
AGENT.

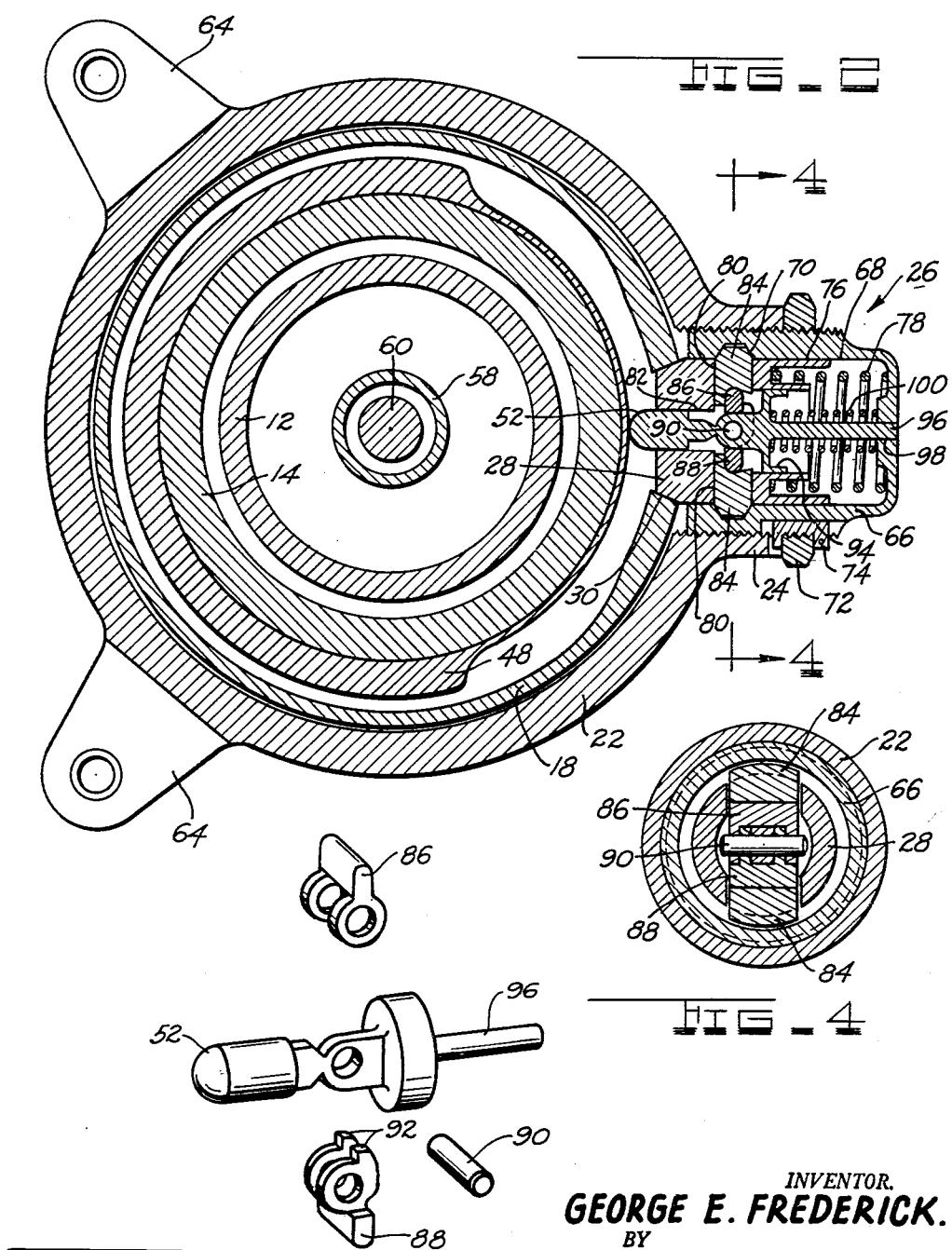

United States Patent Office 3,006,579
Patented Oct. 31, 1961

3,006,579
STEERING DISENGAGING MECHANISM
George E. Frederick, South Bend, Ind., assignor to The Bendix Corporation, a corporation of Delaware
Filed May 19, 1960, Ser. No. 30,134
3 Claims. (Cl. 244—50)

This invention relates to a steering disengaging mechanism and more particularly to a mechanism having a steered member and a steering member which locks the two members together and is automatically operative to effect disengagement of the two members for free swiveling.

It is an object of the present invention to provide a steering disengaging mechanism of a relatively compact and simplified design.

It is another object of the present invention to provide a steering disengaging mechanism which automatically disengages the steered member when resolved through a predetermined arc.

It is another object of the present invention to provide apparatus for locking a steered member and steering member including a cam operated quick-release mechanism which instantaneously and positively releases the steered member from the steering member when the steering member has rotated through a predetermined arc.

It is a still further object of the present invention to provide a steering disengaging mechanism in a self contained package separate from the steering mechanism which may be readily serviced and/or replaced without disassembling or otherwise disturbing the steering mechanism.

It is yet another object of the present invention to provide a steering disengaging mechanism having a readily visible indicator for indicating whether the mechanism is in a locked or released position.

The above and other features and objects of the invention will become more apparent from a consideration of the following description which proceeds with reference to the accompanying drawings, wherein:

FIGURE 1 is an illustration of an aircraft landing gear incorporating the present invention wherein a portion of said gear is broken away to more clearly disclose the invention;

FIGURE 2 is a sectional view of the landing gear of FIGURE 1 taken along section 2—2 showing in detail the operative interrelation of the steering mechanism and quick-release locking means;

FIGURE 3 is an isometric exploded view of a portion of a suitable quick release mechanism; and FIGURE 4 is a cross sectional view taken along section 4—4 of FIGURE 2.

Referring to FIGURE 1, a landing gear generally indicated at 10 is representative of one of many types of steering mechanisms in which my invention may be suitably used and is comprised of first and second tubular members or struts 12 and 14 which are movable relatively to each other along a vertical longitudinal axis to provide a strut support and shock absorbing action in a manner well known to those skilled in the landing gear art. First, tubular member 12 is a fixed member when the gear is in the down position and includes a support shaft 16 which is adaptable to secure the gear 10 to an aircraft, not shown, and further to enable the gear to pivot upwardly during retraction thereof. A third or rotatable tubular member 18, having a wheel supporting bracket 20 formed thereon, is mounted over the lower end of tubular member 14 so as to move axially in the vertical direction along with member 14, but which is rotatable relative to said member. The upper end of rotatable member 18 has a flange 21 formed on its outer diameter which provides a bearing support for ring shaped steering collar 22 which is rotatable with respect to member 14 except when locked thereto as will be later described. Steering collar 22 has a raised boss 24 formed thereon, a locking device generally indicated at 26 is received in boss 24 and includes a locking plunger 28 which is received in an opening 30 of tubular member 18 such that collar 22 is locked relatively with respect to tubular member 18 when plunger 28 is received in opening 30 but is rotatable with respect thereto when said plunger is withdrawn.

Steering movement as first initiated by the pilot or other request means is rotatively applied to journalled shaft 32 which includes a carrier bolted to fixed tubular member 12. This steering movement is transmitted to a second shaft 36 similarly attached to movable tubular member 14 by means of torque link 34 which is operative to transmit the rotative steering movement between two axially movable members. Steering movement is transmitted from shaft 36 through linkage arrangement 38 to lever 40 which provides an input position signal to a suitable power steering apparatus 42. Power amplified steering movement is taken from power steering apparatus 42 by output shaft 44 and is connected to steering collar 22 by means of any suitable linkage connection represented by dashed lines 46 such that the rotative position of collar 22 will be directly responsive to the steering request. Assuming plunger 28 is in the locked position (inserted in opening 30) the movement of collar 22 will be transmitted to rotating tubular member 18 and thus also the wheel positioning bracket arrangement 20.

A ring shaped cam member 48 is sandwiched between rotating member 18 and axially movable tubular member 14 (which is not rotatable) and secured by pins 50 to the member 14. Locking device 26 includes a cam follower 52 slidable in a longitudinal bore formed in plunger 28 and rides on the surface of ring cam 48. Follower 52 operates as a release trip for plunger 28 in response to variations in the height of ring cam 48 in a manner which will be later described.

Retraction of landing gear 10 can be effected by applying retraction effort to bracket 54 which is formed integrally with first tubular member 12, causing landing gear 10 to pivot upwardly around shaft 16. In order that gear 10 may occupy a minimum volume when retracted, bracket 56 is provided which may be utilized to apply an upward force on movable tubular member 14 and to telescope members 12 and 14. Sleeve 58 and metering pin 60 form a portion of a well known shock absorbing system.

FIGURE 2 is an enlarged section view taken along section lines 2—2 of the drawing of FIGURE 1, showing the relative concentric relationship of fixed tubular member 12, axially movable tubular member 14, ring cam 48, rotatable tubular member 18, and steering collar 22. Steering collar 22 has a pair of lugs 64 formed thereon which may be connected to receive steering movement from connection 46. Locking device 26 is more clearly illustrated in FIGURE 2 and in addition to plunger 28 and follower 52 is comprised of a cap or housing member 66 which is threadedly received in boss 24 and which has a hollowed interior defined by an inner cylindrical wall 68 in which plunger 28 is slidably received. Cap 66 further includes a beveled edge notch or groove 70 and is secured in position relative to boss 24 by jam nut 72 and key 74. Plunger 28 has an annular groove 76 formed in its right end which receives and guides compression spring 78 which is retained on one end by cap 66 and on the other by plunger 28. The force produced by spring 78 urges plunger 28 outwardly to the left where it is received by the opening 30 of rotatable tubular member 18, which also has beveled edges. Plunger 28 contains radial slots 80 and the previously mentioned longitudinal bore 82 in which the follower 52 is slidable. A pair of latch members 84 are disposed in slots 80 and are beveled on the radially outwardly extending end and receivable in the complementary beveled notch or groove 70. Latch members 84 are maintained in an outwardly extending position by a pair of toggle arms 86 and 88 which are each separately pivotable about a common pivot shaft 90 passing through the follower 52 (see FIGURE 3). Toggle arm 88 includes a pair of projections 92 which contact the cross arm portion of toggle arm 86 to provide a limiting stop means which permits the toggle arms to collapse only on one side (left) of the pivot shaft 90. Cam follower 52 includes a flared skirt portion 94 and a guide stem 96 which are respectively slidable in plunger 28 and end cap 66 through opening 98. A second compression spring member 100 is concentrically disposed over stem 96 and is retained on one end by cap 66 and on the other by follower 52 producing a force urging follower 52 to the left and into contactive engagement with ring cam 48. When follower 52 is in its extreme left position, toggle arms 86 and 88 are righted and thrust latch members 84 outwardly into engagement with groove 70 which secures plunger 28 in its locked position in opening 30.

FIGURE 4 is a cross sectional view taken along section 4—4 of FIGURE 2 to more clearly illustrate a preferred relating width of latch members 84 and cooperating slots 80 in plunger 28.

*Operation*

Assuming plunger 28 is in its locked position as illustrated, any steering movement imparted to collar 22 will be transmitted to the rotatable tubular member 18 and the wheel bracket arrangement 20 so that steering of the wheel may be effected within its design range of operation which generally is less than 90° to either side of a straight ahead position. Under these conditions the transmission of turning torque from collar 22 to rotatable member 18 causes a force to be produced acting on the beveled edge of plunger 28 normal to the beveled surface and which has a component tending to urge plunger 28 to the right in opposition to the force produced by spring 78. Movement to the right of plunger 28 is prevented, however, by latch members 84 which are unable to withdraw from groove 70 when toggle arms 86 and 88 are in an extended position as shown. Thus it will be appreciated that it is the axial position of follower 52 that determines whether toggle arms 86 and 88 are in a collapsed or extended position and therefore the subsequent release of latch members 84 and plunger 28.

Assume now that it is desired to rotate rotatable member 18 beyond the design range of operation such as might be desired when towing an associated aircraft to a parking position. In this case turning effort would be applied to rotatable member 18. Said member 18 and steering collar 22 would move as a unit until follower 52 encountered a rise in the contour of ring cam 48. As follower 52 began to move in opposition to the force of spring 100 as a result of increased cam rise, toggle arms 86 and 88 begin to rotate about pivot shaft 90. Bearing in mind that latch members 84 have a force component tending to urge them inwardly resulting from the beveled edge, this component now becomes operative to further cause the collapse of toggle arms 86 and 88 in rapid fashion thus fully withdrawing members 84 from groove 70 and permitting plunger 28 to move to the right out of opening 30 and disengaging collar 22 from rotatable member 18 and permitting full 360° swiveling of the wheels.

It will be also noted that when disengagement occurs follower 52 has moved to the right from its illustrated position thus causing guide stem 96 to project from cap 66 to provide a visual indication of disengagement.

Re-engagement is effected whenever opening 30 is realigned with plunger 28 in the design range of operation as the springs 78 and 100 tend to urge said plunger and latching members 84 into a locked position. This may be effected by either recentering rotatable member 18 or by providing suitable castor on the associated wheels which will produce automatic centering when the aircraft is in motion.

Toggle arms 86 and 88 and latching members 84 are one form of a suitable quick-release mechanism that may be used in my steering disengaging apparatus. Reliance is not placed on the particular construction of the quick release mechanism for novelty of the instant invention and rather it is comprehended that anyone skilled in the steering art may substitute in its stead other known mechanisms and in addition may make other numerous minor changes and modifications without departing from the underlying principles of the invention as defined in the following claims. Further, the present invention is in no manner limited to aircraft applications with which it has been herein described as a preferred embodiment, but rather it is comprehended that the invention may be readily applied to air, space, land, sea or stationary installations wherein disengagement between rotary concentric parts is desired upon movement through a predetermined arc.

I claim:

1. In a steering mechanism, the combination of a tubular support member, a rotatable wheel supporting member having generally a cylindrical shape over a substantial portion of the length thereof and rotatably mounted on one end of said tubular support member, a ring shaped cam member having a contoured surface secured circumferentially to said tubular support member and projecting within said rotatable wheel supporting member, said rotatable wheel supporting member including an opening in the cylindrical shaped portion thereof adjacent the contoured surface of said cam member, a steering collar rotatably mounted on said wheel supporting member and external thereto, a locking device rigidly supported by said steering collar including a locking plunger spaced cooperatively to said opening so that said plunger is operative to project into said opening and interlock said steering collar and said wheel supporting member, said locking device further including means for maintaining said plunger in said projected position, and cam follower means positionally responsive to the contoured surface of said cam member operative with said last named means for releasing said plunger from said projected position.

2. In a steering mechanism as claimed in claim 1 wherein said opening and said plunger have cooperating beveled edges operative to produce a force component urging the withdrawal of said plunger from said opening during rotation of said wheel supporting member.

3. In a device having rotary or angular movement, the combination of inner and outer concentric tubular members, said inner member being fixed rotatively and having a cam surface formed thereon, said outer member movable rotatively relative to said inner member, a steering collar rotatively mounted externally on said outer concentric tubular member, a locking device secured to said steering collar cooperatively operative with said outer member to interlock said outer member and said steering collar and prevent relative rotation therebetween, and follower means rotative with said steering collar responsive to said cam surface operative to disengage said locking device and permit relative rotation between said steering collar and said outer member.

References Cited in the file of this patent

UNITED STATES PATENTS 2,344,157    Maule _____ Mar. 14, 1944